US005783288A

United States Patent [19]

Fujita et al.

[11] Patent Number: 5,783,288

[45] Date of Patent: *Jul. 21, 1998

[54] TONER CARRIER AND METHOD OF PRODUCING THE SAME

[75] Inventors: Takashi Fujita, Kawasaki; Atsushi Ohta; Mitsuru Hasegawa, both of Yokohama; Seiji Ishii, Chigasaki, all of Japan

[73] Assignee: Ricoh Company, Ltd., Tokyo, Japan

[ * ] Notice: The term of this patent shall not extend beyond the expiration date of Pat. No. 5,456,782.

[21] Appl. No.: 852,687

[22] Filed: May 7, 1997

Related U.S. Application Data

[60] Continuation of Ser. No. 423,046, Apr. 17, 1995, abandoned, which is a division of Ser. No. 323,574, Oct. 17, 1994, Pat. No. 5,456,782, which is a continuation of Ser. No. 966,508, Oct. 23, 1992, abandoned.

[30] Foreign Application Priority Data

| | | | |
|---|---|---|---|
| Oct. 24, 1991 | [JP] | Japan | 3-305304 |
| Oct. 29, 1991 | [JP] | Japan | 3-309652 |
| Feb. 14, 1992 | [JP] | Japan | 4-59214 |
| Aug. 31, 1992 | [JP] | Japan | 4-255762 |

[51] Int. Cl.[6] .......... B32B 3/00

[52] U.S. Cl. .......... 428/195; 428/222; 428/411.1; 428/913; 428/914

[58] Field of Search .......... 428/195, 411.1, 428/222, 234, 913, 914; 355/284; 219/216

[56] References Cited

U.S. PATENT DOCUMENTS

| | | | |
|---|---|---|---|
| 3,362,861 | 1/1968 | Barker et al. | 156/185 X |
| 3,876,424 | 4/1975 | Inoue et al. | 96/1 LY |
| 4,514,245 | 4/1985 | Chabrier | 156/187 X |
| 4,707,206 | 11/1987 | Trepus, Jr. et al. | 156/187 |
| 4,822,436 | 4/1989 | Callis et al. | 156/211 |
| 4,872,933 | 10/1989 | Tews | 156/284 |
| 5,172,169 | 12/1992 | Takashima et al. | 355/246 |
| 5,239,344 | 8/1993 | Enoki et al. | 118/651 X |

OTHER PUBLICATIONS

06–130793, Patent Abstracts of Jap.,Grp.No.P1784,vol. 18,No. 426,Pub. Date Aug. 9, 1994, Hasegawa.

*Primary Examiner*—William Krynski
*Attorney, Agent, or Firm*—Oblon, Spivak, McClelland, Maier & Neustadt, P.C.

[57] ABSTRACT

A method of producing a developing roller applicable to a developing device included in an image forming apparatus and capable of carrying a great amount of toner thereon by generating microfields. The surface of a conductive base is covered with a net constituting of conductive fibers and dielectric fibers woven together. The fibers are heated by a heater to melt with the result that conductive portions and dielectric portions appear on the surface of the developing roller.

44 Claims, 15 Drawing Sheets

TONER CARRIER AND METHOD OF PRODUCING THE SAME

This application is a Continuation of application Ser. No. 08/423,046, filed on Apr. 17, 1995, now abandoned, which is a Divisional of application Ser. No. 08/323,574, filed on Oct. 17, 1994, now U.S. Pat. No. 5,456,782, which is a Continuation of application Ser. No. 07/966,508, filed on Oct. 23, 1992, now abandoned.

BACKGROUND OF THE INVENTION

The present invention relates to a toner carrier incorporated in a developing device of an image forming apparatus, and a method of producing the same.

An electronic copier, printer, facsimile transceiver or similar image forming apparatus of the type forming an electrostatic latent image on an image carrier and developing it to produce a toner image is conventional. It is a common practice with this type of apparatus to use a developing device operable with a one component developer, i.e., a toner with or without an auxiliary agent added thereto. Specifically, a toner carrier in the form of a roller or a sleeve transports the toner to a developing region where it faces the image carrier. The toner develops a latent image electrostatically formed on the image carrier to produce a corresponding toner image. This type of developing device promotes easy management and miniature construction, compared to a developing device operable with a two component developer including a carrier. However, with the device using a one component developer, it is difficult to deposit a sufficient amount of toner on the toner carrier and convey it to the developing region. Therefore, it is likely that the amount of toner available for development is short, lowering the density of the resulting toner image.

In light of this, there has been proposed a developing device which selectively deposits a charge on the surface of a toner carrier to generate numerous microfields near the surface of the toner carrier, causes a great amount of toner to deposit on the toner carrier due to the microfields, and develops an electrostatic latent image by such a toner, as disclosed in Japanese Patent Application No. 275061/1990 by way of example. With this type of developing device, it is possible to cause the toner carrier to carry a great amount of sufficiently charged toner thereon due to the microfields and convey it to the developing region, whereby a high quality toner image is insured. Various methods of producing a toner carrier applicable to such a developing device have also been proposed in the past. For example, a method disclosed in Japanese Patent Application 88650/1990 consists in spraying metal particles onto the surface of a conductive base, forming a dielectric coating on the metal particles, hardening the coating, and then grinding the surface of the coating to cause the conductive surfaces of the metal particles and the dielectric substance to appear on the periphery of the resulting toner carrier. However, the conventional toner carriers and methods of producing them are not practicable without resorting to a great number of steps for the production and, therefore, high cost.

SUMMARY OF THE INVENTION

It is, therefore, an object of the present invention to provide an inexpensive toner carrier capable of generating microfields, and a method of producing the same.

In accordance with the present invention, a toner carrier comprises a conductive base, and a microfield generating layer covering the surface of the base and formed by melting at least part of conductive fibers and dielectric fibers. The microfield generating layer has conductive portions and dielectric portions formed by the conductive fibers and dielectric fibers and appearing on a surface of the microfield generating layer, the conductive portions contacting the base.

Also, in accordance with the present invention, a method of producing a toner carrier comprises the steps of covering the surface of a conductive base with conductive fibers and dielectric fibers, and heating the conductive fibers and dielectric fibers to melt at least part of the conductive fibers and dielectric fibers, whereby conductive portions and dielectric portions are formed and appear on the surface of the toner carrier.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
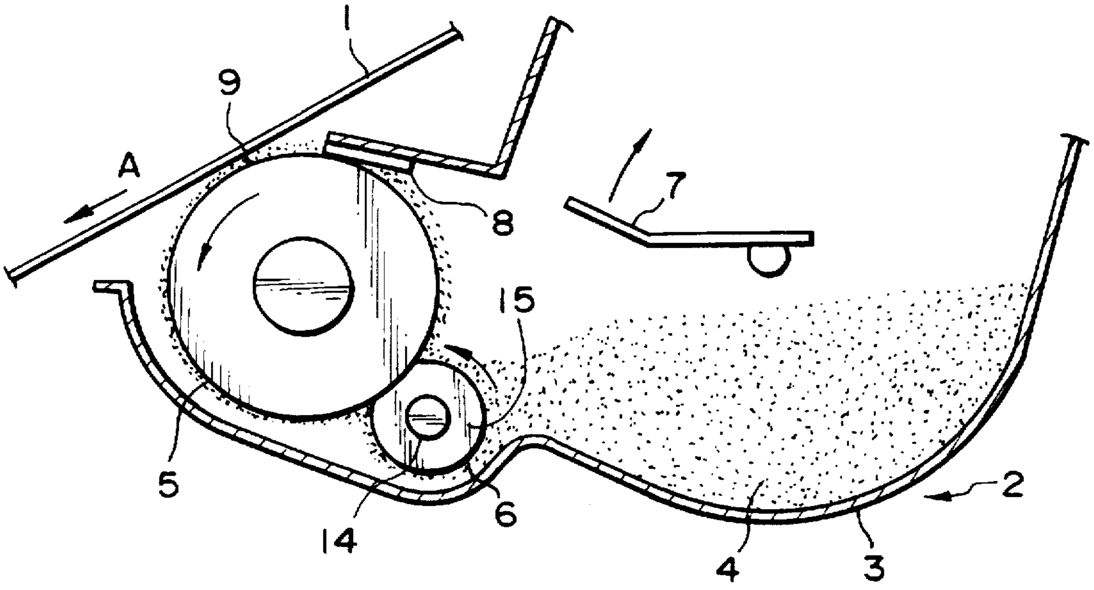
FIG. 1 is a section showing a specific construction of a developing device.

Referring to FIG. 1 of the drawings, a developing device with which various embodiments of the present invention are practicable is shown. As shown, an image carrier is implemented as a photoconductive belt 1 movable in a direction indicated by an arrow A. The developing device, generally 2, is located to face the belt 1 and has a casing 3 storing a toner 4 therein. The toner 4 is a one component developer with or without an auxiliary agent added thereto. The toner 4 is assumed to be nonmagnetic although it may be magnetic. The volumetric resistivity of the toner 4 may be about $10^7$ Ωcm to $10^{12}$ Ωcm. A developing roller 5 is supported by opposite side walls, not shown, of the casing 3 and is partly exposed to the outside through an opening formed in the casing 3. The developing roller 5 is rotatable counterclockwise, as viewed in the figure, while facing the belt 1. The developing roller 5 is a specific form of a toner carrier and may be replaced with a belt, if desired. A toner supply roller 6 is also supported by the side walls of the casing 3 and is rotatable, for example, counterclockwise in contact with the developing roller 5.

The toner 4 in the casing 3 is driven toward the toner supply roller 6 by an agitator 7 while being agitated by the agitator 7. The toner supply roller 6 conveys the toner 4 to the developing roller 5. When the toner 4 is transferred from the roller 6 to the roller 5, it is charged to a predetermined polarity due to friction and, therefore, it is electrostatically deposited on the periphery of the roller 5. The toner 4 is transported by the developing roller 5 to a developing region 9 while being regulated into a layer of uniform thickness by a doctor blade 8. In the developing region 9 where the developing roller 5 faces the belt 1, the toner 4 is electrostatically transferred to an electrostatic latent image formed on the belt 1 to develop the latent image. Part of the toner 4 moved away from the developing region 9 without being transferred to the belt 1 is returned to the toner supply roller 6 by the developing roller 5. The developed image, i.e., toner image on the belt 1 is transferred to a recording sheet, e.g., paper sheet and is then fixed on the medium by a fixing device.

The developing mechanism will be described in detail.

Figure 2:
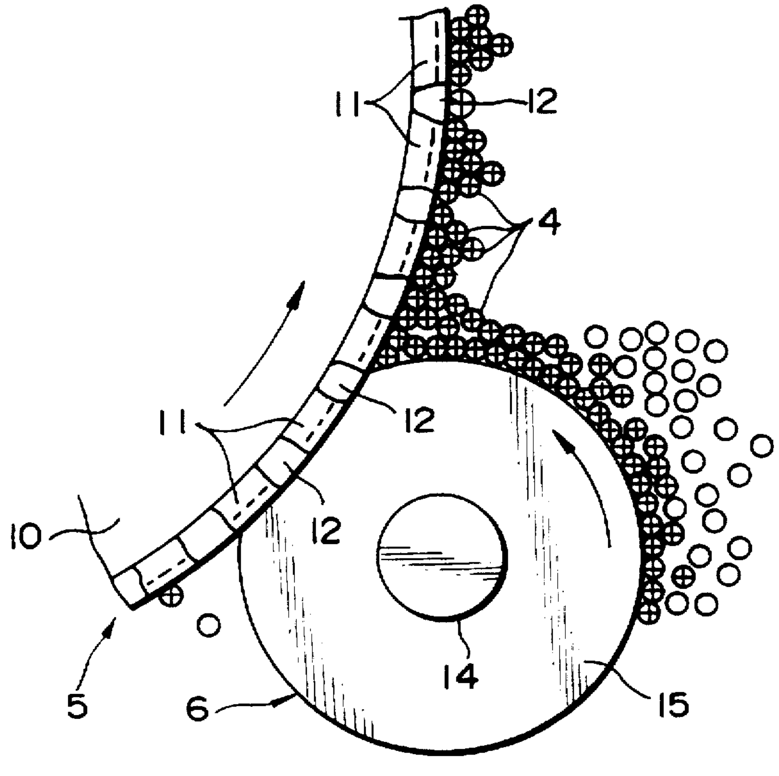
FIG. 2 is an enlarged sketch of the surface of a developing roller and toner particles.

As shown in FIG. 2, the developing roller 5 is made up of a base 10, a number of conductive portions 12, and a number of dielectric portions 11. The base 10 is made of aluminum (Al) or a similar conductive material. The conductive portions 12 and dielectric portions 11 are provided on and formed integrally with the surface of the base 10. The base 10 is implemented by a hollow or solid cylindrical body. The layer constituted by the conductive portions 12 and dielectric portions 11 generates microfields which will be described specifically later. A method of producing the developing roller 5 will also be described later. In FIG. 2, the conductive portions 12, dielectric portions 11 and toner 4 are shown in an enlarged sketch for easy understanding. The conductive portions 12 and dielectric portions 11 are distributed over the surface of the developing roller 5 (see FIGS. 9 and 14), and each has an extremely small area. The conductive portions 12 are held in contact with and, therefore, electrically connected to the base 10. The base 10 is applied with a DC, AC, DC-superposed AC or pulse voltage or is simply connected to ground.

The toner supply roller 6 contacting the developing roller 5 is made of a material which frictionally charges the dielectric portions 11 of the roller 5 to a polarity opposite to the polarity of the toner 4 in contact with the portions 11. In the specific configuration, the toner supply roller 6 has a conductive core member 14 and a cylindrical foam body 15 surrounding the core member 14. The foam body 15 is pressed against the developing roller 5 while being elastically deformed.

Part of the developing roller 5 moved away from the developing region 9 is brought into contact with the roller 6, as stated earlier. Then, the toner supply roller 6 scrapes off the toner 4 from the developing roller 5 mechanically and electrically while frictionally charging the dielectric portions 11 of the roller 5 to the polarity opposite to the polarity of the toner 4. On the other hand, the toner 4 being transported by and in contact with the toner supply roller 6 toward the developing roller 5 is charged by friction, as shown in FIG. 2. At this instant, this part of the toner 4 is charged more intensely by the friction thereof with the developing roller 5.

Figure 3:
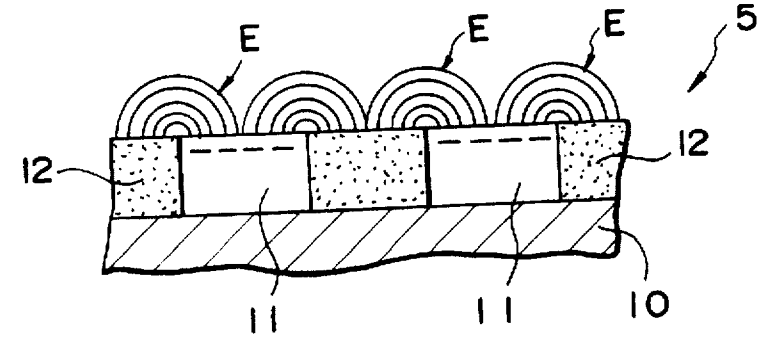
FIG. 3 schematically shows the electric lines of force of microfields developed near the surface of the developing roller.

In the above condition, a charge opposite in polarity to that of the toner is selectively deposited on the dielectric portions 11 of the developing roller 5 since the conductive portions 12 are exposed on the surface of the roller 5. As a result, a microfield E is generated between each conductive portion 12 and the charged deelectric portions 12 adjoining it, as shown in FIG. 3. Specifically, numerous microfields E are developed near the surface of the developing roller 5. In the specific condition shown in FIGS. 2 and 3, the dielectric portions 11 and the toner 4 are charged negatively and positively, respectively. The microfields E are extremely intensified by a so-called edge effect or fringing effect with the result that the charged toner 4 is intensely attracted toward the surfaces of the dielectric portions 11. Consequently, the toner 4 is firmly retained in a great amount on the surface of the developing roller 5.

The doctor blade 8 regulates the thickness of the toner 4 carried on the developing roller 5 to thereby form a toner layer. At this instant, part of the toner 4 which is sufficiently charged is strongly retained on the surface of the developing roller 5 by the microfields E, while the other part is removed by the doctor blade 8. As a result, a great amount of toner 4 with a sufficient charge is transported to the developing region 9 for developing a latent image. This surely provides the resulting toner image with high density.

While the dielectric portions 11 have been shown and described as being charged to a polarity opposite to the polarity of the toner 4, they may be charged to the same polarity as the toner to deposit a great amount of toner on the conductive portions 12.

The developing device of the type described has been proposed in the past. A method of producing the developing roller 5 which is representative of a first embodiment of the present invention will be described hereinafter.

Figure 4:
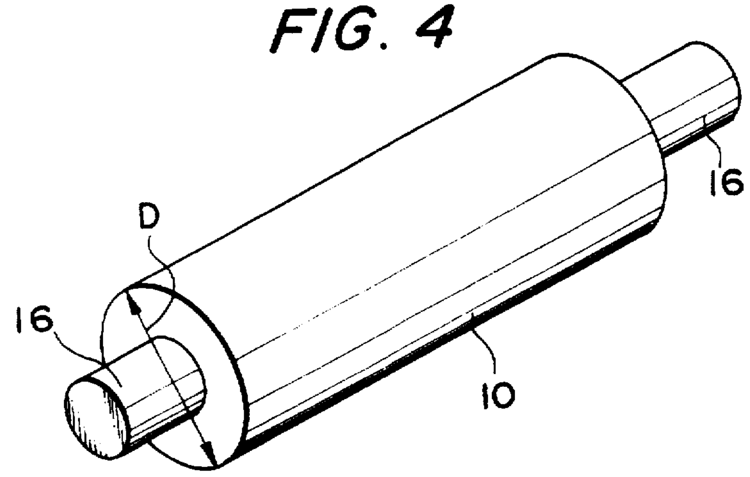
FIG. 4 is a perspective view of a base forming part of the developing roller.
Figure 5:
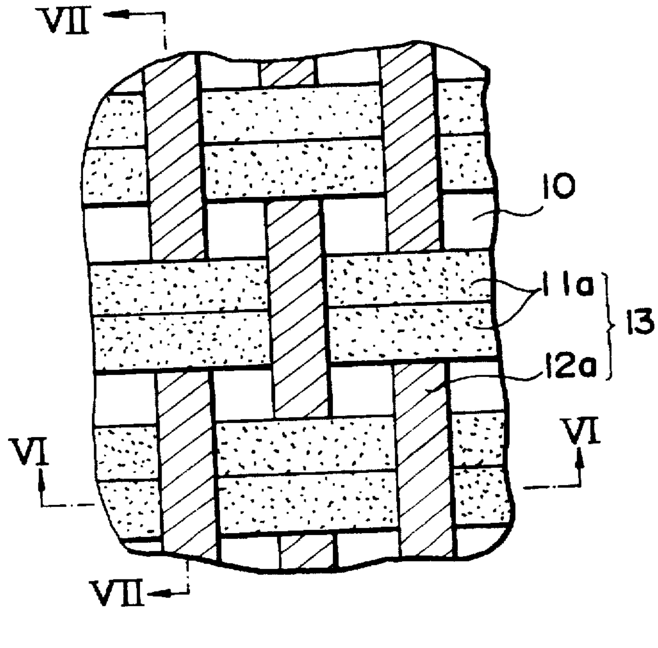
FIG. 5 is an enlarged plan view of the surface of a base and a net representative of a first embodiment of the present invention.
Figure 6:
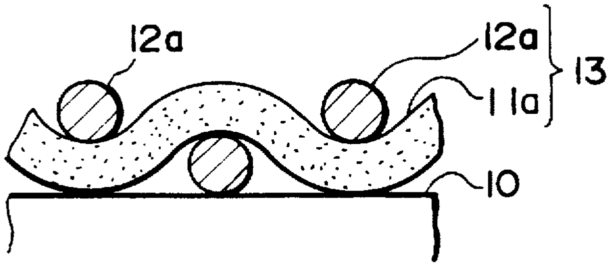
FIG. 6 is a section along line VI—VI of FIG. 5.
Figure 7:
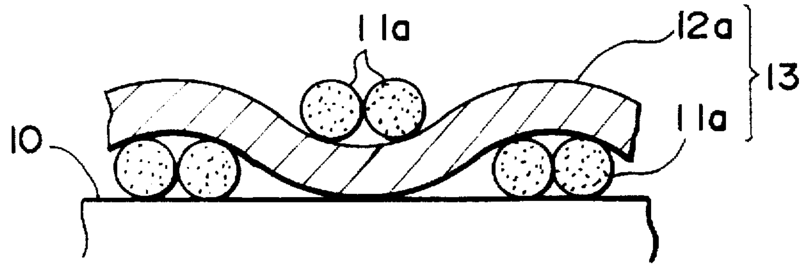
FIG. 7 is a section along line VII—VII of FIG. 5.

As shown in FIG. 4, the base 10 made of Al, copper (Cu), iron (Fe) or a similar conductive material is prepared. In the illustrative embodiment, the base 10 is made of Al and provided with a diameter D of 19.8 millimeters, although such a diameter is not limitative. Then, the base 10 is covered with a net 13 (see FIG. 8) which is a specific form of conductive fibers and dielectric fibers. As shown in FIGS. 5, 6 and 7, the net 13 has conductive fibers 12a and dielectric fibers 11a woven together. The net 13 may be configured as a sheet and wound round the surface of the base 10. Alternatively, the net 13 may be implemented as a hollow cylinder and fitted on the periphery of the base 10. In FIGS. 5–7, the conductive fibers 12a and the dielectric fibers 11a are respectively indicated by hatching and dots for easy distinction. In FIGS. 6 and 7, hatching indicative of a section is not shown (this is also true in FIGS. 9 and 11).

In this embodiment, the conductive fibers 12a are constituted by Nylon 6 fibers of 160 denier and containing carbon while the dielectric fibers 11a are constituted by Nylon 6 fibers of 100 denier. Specifically, both the conductive fibers 12a and the dielectric fibers 11a are made of thermoplastic resin.

Figure 8:
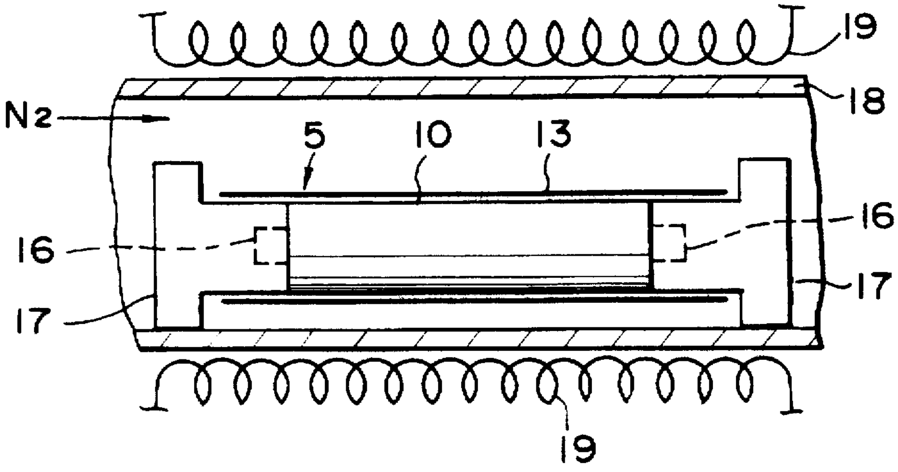
FIG. 8 shows a specific construction of a heating device.

As shown in FIG. 8, the base 10 has opposite shaft portions 16 thereof supported by a jig 17. Then, the base 10 is put in a quartz pipe 18 and is then heated by a heater 19 for 1 minute at 280 degrees centigrade in a nitrogen atmosphere. As a result, the fibers 11a and 12a are heated to melt Nylon 6.

Figure 9:
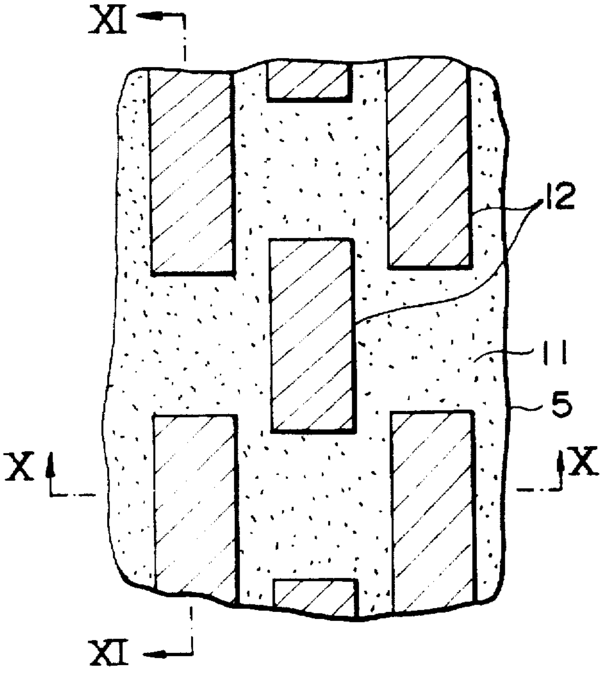
FIG. 9 is an enlarged plan view of the surface of a developing roller on which fibers are melted.
Figure 10:
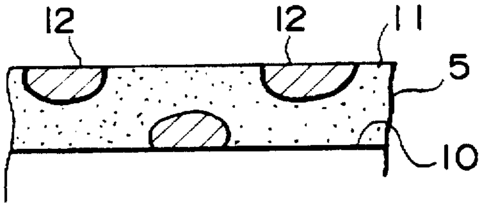
FIG. 10 is a section along line X—X of FIG. 9.
Figure 11:
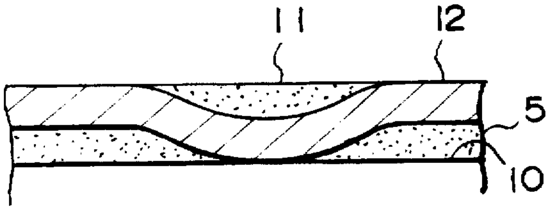
FIG. 11 is a section along line XI—XI of FIG. 9.

After the fibers 11a and 12a have been melted, the surface of the developing roller 5 appears as shown in FIG. 9. As shown in FIGS. 9–11, the conductive portions 12 and the dielectric portions 11 constituted by the materials of the fibers 12a and 11a, respectively, appear on the surface of the developing roller 5. The conductive portions 12 each has a small area on the surface of the roller 5 and remains in contact, i.e., electrical connection with the base 10.

Subsequently, the film formed by the dielectric portions 11 and conductive portions 12 is cooled to complete the developing roller 5. The film affixed to the base 10 by the above procedure forms a microfield generating layer. In this manner, the developing roller 5 shown in FIGS. 1–3 can be surely produced with ease.

Generally, Nylon 6 has a melting point of about 215 degrees to 220 degrees centigrade. Hence, the fibers 11a and 12a made of Nylon 6 will not melt unless heated at a temperature higher than such a melting point. Further, should the heating temperature be excessively low, the resulting roller 5 would fail to have a smooth surface and, therefore, the expected function. Conversely, should the heating temperature be excessively high, the carbon contained in the fibers 12a would be dispersed to render the entire surface of the roller 5 semiconductive, and moreover Nylon 6 might be decomposed. In light of this, when use is made of Nylon 6 fibers, the heating temperature should preferably range from 220 degrees to 280 degrees centigrade. With such a temperature range, it is possible to produce the roller 5 having a smooth surface and having the dielectric portions and conductive portions 12 surely appearing on the surface thereof. Particularly, when the heating temperature is 280 degrees centigrade, as mentioned previously, the fibers 11a and 12a melt to form the film in a short time, and in addition the viscosity of melted Nylon 6 is lowered to provide the roller 5 with a more smooth surface. Actually, when the roller 5 was heated at 280 degrees centigrade for 1 minute, the roller 5 was found to have a surface roughness Rz of 8 microns.

Figure 12:
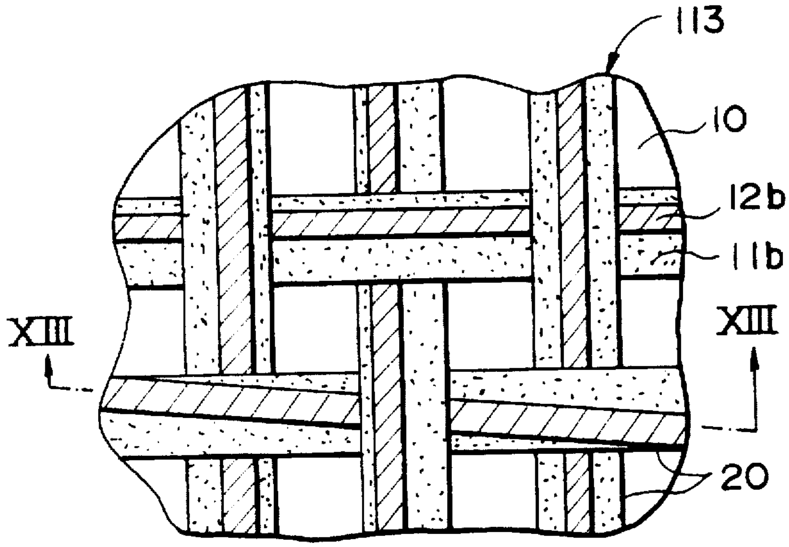
FIG. 12 is an enlarged plan view showing a second embodiment of the present invention.
Figure 13:
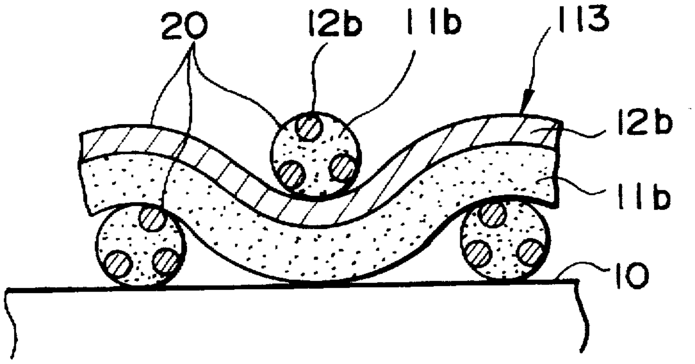
FIG. 13 is a section along line XIII—XIII of FIG. 12.

Referring to FIGS. 12 and 13, a second embodiment of the present invention will be described. As shown, the base 10, FIG. 4, configured in exactly the same manner as in the first embodiment is covered with a net 113. The net 113, like the net 13, has fibers 20 woven together and is a specific form of conductive material and dielectric material. The difference is that the fibers 20 each have conductive portions 12b and a dielectric portion 11b therein. In FIGS. 12 and 13, the conductive portions 12b and the dielectric portions 11b are indicated by hatching and dots, respectively, while in FIG. 13 hatching indicative of a section is not shown (this is also true in FIGS. 14 and 15).

The fibers 20 may advantageously be implemented by Mega (trade name) available from Unichika (Japan). The thermoplastic resin constituting the fibers 20 is also Nylon 6, and the conductive portions 12b are made of carbon-containing Nylon 6. The base 10 with the net 113 is heated at 280 degrees centigrade for 1 minute by the heating device described with reference to FIG. 8, whereby Nylon 6 constituting the fibers 20 is melted.

Figure 14:
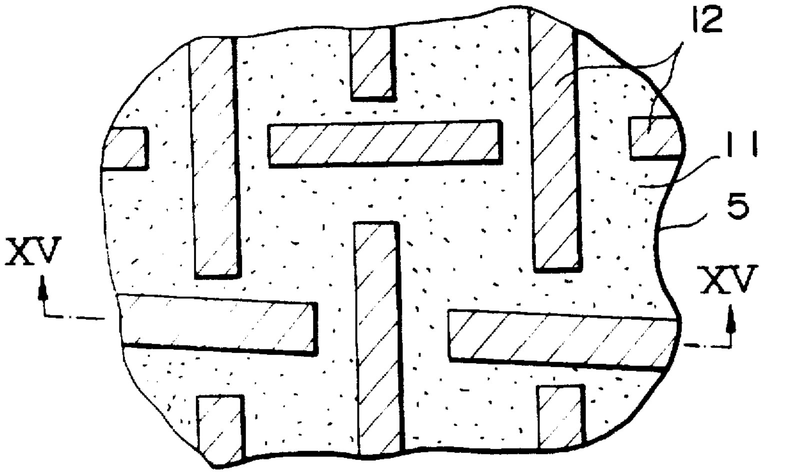
FIG. 14 is an enlarged plan view showing the surface of the developing roller of the second embodiment.
Figure 15:
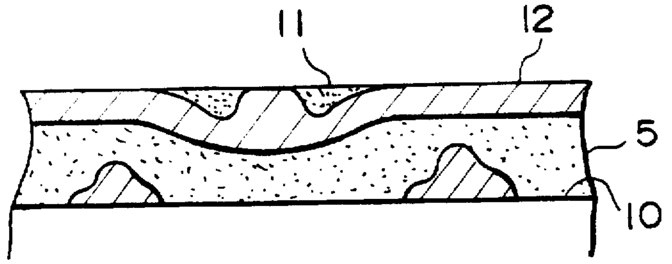
FIG. 15 is a section along line XV—XV of FIG. 14.

FIGS. 14 and 15 show the fibers 20 in a melted condition. As shown, the conductive portions 12 and the dielectric portions 11 formed by the materials of the conductive portions 12b and the dielectric portions 11b, respectively, appear on the surface of the roller 5. The conductive portions 12 are held in contact with the conductive base 10. When the fibers 20 are made of Mega, melted under the previously stated conditions, and then cooled, the surface roughness Rz of the resulting roller 5 was also measured to be 8 microns.

The net 13 or 113 having the fibers 11a and 12a or the fibers 20 woven together may be replaced with a net having fibers connected together by melting or a net in the form of a mixed yarn of conductive fibers and dielectric fibers.

Figure 16:
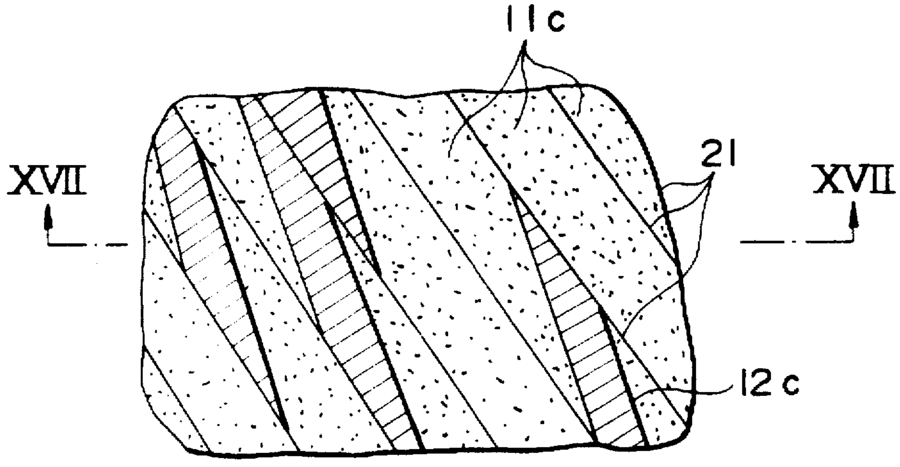
FIG. 16 is an enlarged plan view showing a third embodiment of the present invention.
Figure 17:
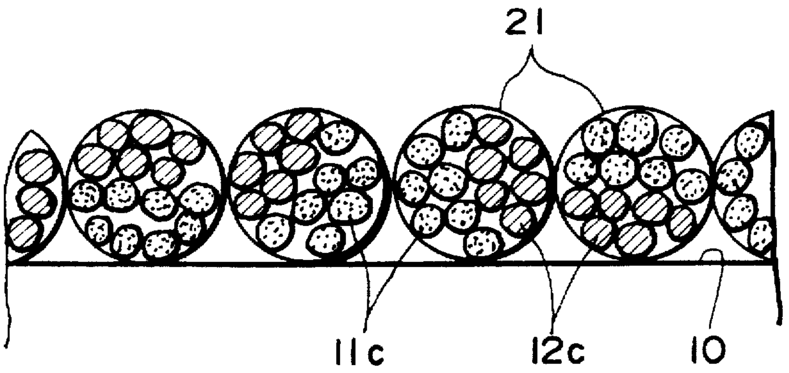
FIG. 17 is an enlarged section along line XVII—XVII of FIG. 16.

Further, the fibers may be directly wound round the conductive base 10, instead of being configured as a net. FIGS. 16 and 17 show a third embodiment of the present invention using such an alternative configuration. As shown, fibers 21 each have Nylon 6 fibers 12c of 120 denier and containing carbon and Nylon 6 fibers 11c of 210 denier twisted together. Such fibers 21 are wound round the base 10 at an angle of substantially 60 degrees relative to the axis of the base 10. The base 10 also has the configuration shown in FIG. 4. The base 10 covered with the fibers 21 is heated at, for example, 280 degrees centigrade by the heating device shown in FIG. 8. The resulting roller 10 has dielectric portions and conductive portions appearing on the surface thereof, the conductive portions contacting the base 10.

When the conductive fibers 12a and dielectric fibers 11a independent of the fibers 12a are used as in the first embodiment of FIGS. 5–7, the conductive portions 12 appear on the surface of the roller 5 in a substantially regular pattern. By contrast, when the fibers 20 shown in FIGS. 12 and 13 are used, the conductive portions 12 appear in an irregular distribution. When the conductive portions 12 are regularly distributed, scratches or similar fine defects on the surface of the roller 5 would appear on an image to thereby degrade the image quality. The irregular distribution of the conductive portions 12 will prevent such defects from being conspicuous on an image.

Regarding the thermoplastic resin constituting the fibers, Nylon 6 may be replaced with any other nylons, e.g., Nylon 12 (melting point of 175 degrees centigrade), polyester, polyethylene, or polypropylene. A conductive filler may be mixed with such a resin to form conductive fibers.

Preferably, the resin should have low viscosity when melted in order to provide the roller 5 with a smooth surface. In this sense, nylon or polyester is advantageous over the other resins. It is likely that the smoothness of the roller surface is lowered during the production, depending on the thickness and material of the fibers as well as the viscosity thereof when melted. In such a case or when the roller 5 is required to have a smooth surface exceeding the surface roughness Rz of 8 microns stated above, the roller 5 may have the surface thereof cut under pressure, ground or polished after the hardening step. If desired, a conductive adhesive may be applied to the surface of the base 10 before covering the base with the fibers in order to intensify the bond between the fibers and the base 10.

While in the embodiments described above all of the conductive and dielectric fibers are melted by heat, only part of such fibers may be melted. For example, only the dielectric fibers 12*a* or the conductive fibers 11*a* of the first embodiment may be melted, in which case the other will be made of a material other than the thermoplatic resin. Acrylonitryl is one of the materials which will not melt in such a condition. This is also true with embodiments which will be described. The crux of the present invention is that conductive fibers and dielectric fibers are heated to melt at least part thereof, thereby exposing the two different portions to appear on the surface of a developing roller.

The prerequisite with the developing device of the type using a one component developer, as shown in FIG. 1, is that the toner carrier in the form of a roller or a belt be provided with extremely high surface precision. If the surface precision is low, the toner layer formed on the toner carrier and, therefore, the density of the resulting toner image will not be uniform. Specifically, the undulations and defects on the surface of the toner carrier should be as small as possible. The undulations would make the density distribution irregular over the entire toner image. If the toner carrier has local dips, pin holes or similar recesses on the surface thereof, the toner layer will become excessively thick at the recesses to make the corresponding toner image portions extraordinary dense. This is apt to produce unexpected black dots in a white image or a halftone image. Conversely, projections on the surface of the toner carrier would excessively reduce the thickness of the toner layer at their positions to noticeably lower the image density. The projections, therefore, appear as blanks in a solid image or a halftone image. The required surface precision increases with the decrease in the particle size of the toner. Further, as the linear velocity of the photoconductive element and that of the toner carrier approach each other to implement a high image forming speed, the precision required of the surface of the toner carrier increases. Specifically, so long as the linear velocity of the toner carrier is low relative to that of the toner carrier, defects on the surface of the toner carrier do not noticeably effect the quality of the toner image. However, as the linear velocity of the toner carrier increases and approaches the linear velocity of the photoconductive element, the defects become conspicuous in the toner image.

The previous embodiments each cover the base with conductive fibers and dielectric fibers and then melt the fibers in a heated atmosphere to thereby produce a toner carrier, i.e., developing roller. This kind of procedure is simple and low cost. However, since such a procedure does not press the fibers during the course of heating, the fibers undulate after melting, depending on the thickness and material, as stated earlier. Moreover, air existing in the fibers and at the interface between the fibers and the base are apt to produce defects on the surface of the toner carrier. In such a case, the surface of the fibers may be finished with high precision after the fibers have been hardened, as stated previously. However, high precision polishing, cutting similar finishing requires extremely high cost. Furthermore, the finishing operation is likely to leave fine polishing marks on the roller surface which would lower the image quality. Specifically, when polishing marks are left on the roller surface, the toner, as well as other substances, is apt to adhere to the roller surface to form a film, degrading the quality of a toner image. This problem is especially serious when use is made of a toner whose particle size is small.

A fourth embodiment which will be described eliminates the above problem by fitting a thermocontractile tube or a rubber or similar elastic tube on the fibers provided on the base, causing the tube to contract while heating the fibers so as to press the fibers, and then removing the tube after a cooling step. This is successful in providing the developing roller with an extremely smooth surface and, therefore, in eliminating the need for polishing or similar finishing.

Figure 18A:
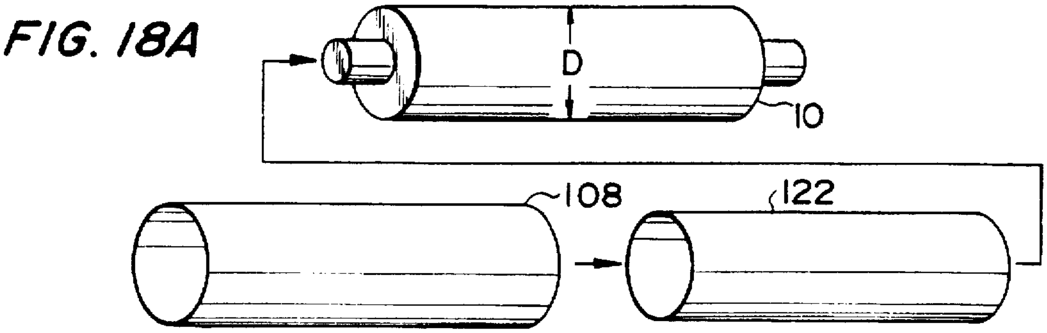
FIGS. 18A–18D demonstrate a sequence of steps for producing the developing roller of the fourth embodiment.
Figure 18B:
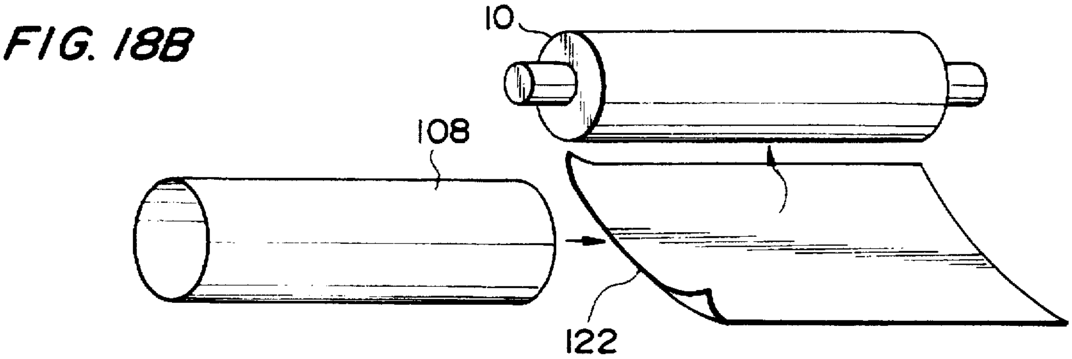

Specifically, as shown in FIG. 18A, the cylindrical conductive base 10 is prepared and covered with conductive fibers and dielectric fibers, collectively designated by the reference numeral 122. The fibers 122 may or may not be implemented as a sheet or a tube, as in the previous embodiments. In the figure, the fibers 122 are configured as a tubular net constituted by fabric of conductive fibers and dielectric fibers. On the other hand, in FIG. 18B, the fibers 122 are woven into a sheet and wound round the conductive base 10. The material of the fibers 122 may be suitably selected, as in the foregoing embodiments.

Figure 18C:
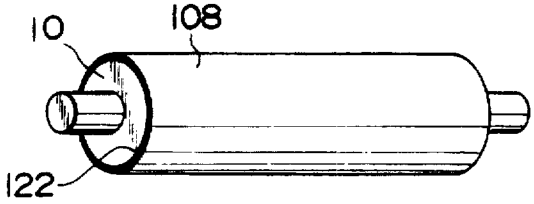
Figure 18D:
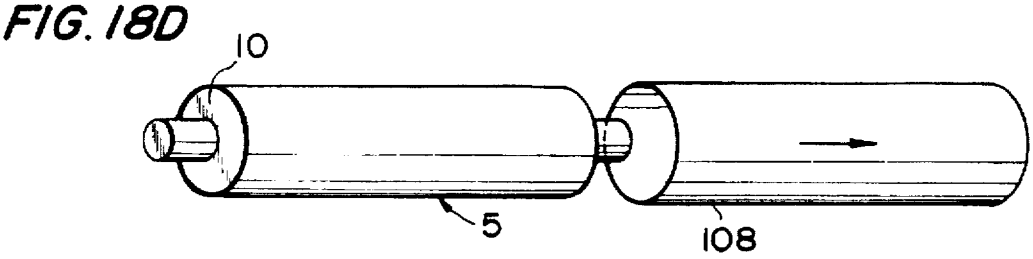
Figure 19:
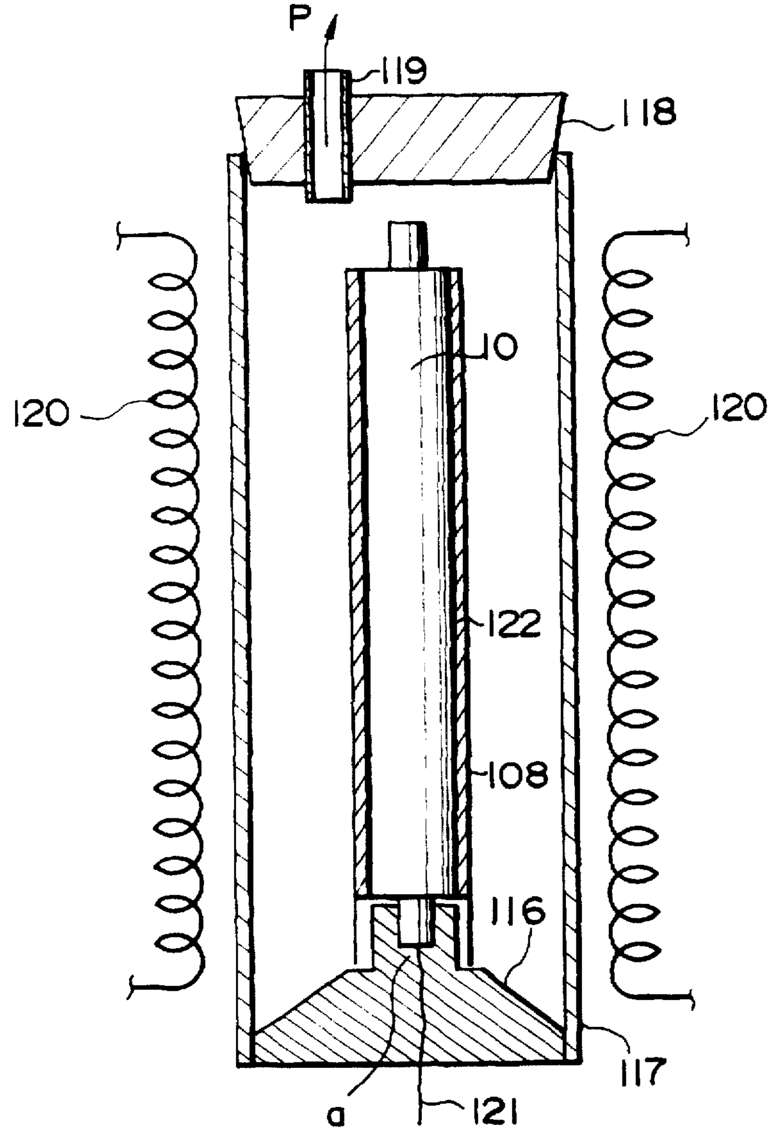
FIG. 19 shows a specific construction of a heating device.

After the base 10 has been covered with the fibers 122, a seamless contractile tube 108 shown in FIG. 18C is fitted on the fibers 122. If desired, the fibers and tube 108 may be put on the base 10 at the same time. The tube 108 may be made of a thermocontractile resin or an elastic material, e.g., rubber. Subsequently, after at least the interface between the fibers 122 and the tube 108 has been depressurized, the fibers 122 are heated to at least partly melt in such a condition that the tube 108 does not melt. As a result the fibers 122 form a film in which dielectric portions and conductive portions appear on the surface, as in the previous embodiments. Since the tube 108 does not melt and contracts, it presses the fibers 122 to thereby make the surface of the film smooth. In addition, since the interface between the fibers 122 and the tube 108 is depressurized, the entire tube 108 closely contacts the fibers 122 without any air existing at the interface to further enhance the smoothness of the film surface. Thereafter, the film, tube 108 and base 10 are bodily cooled to harden the film formed by the fibers 122. Then, the tube 108 is removed from the fibers 122 and base 10, as shown in FIG. 18D. As a result, the hardened film, i.e., microfield generating layer is formed on the base 10 to complete the roller 5.

The smoothness of the surface of the roller 5 attainable with the above procedure is extremely high, e.g., less than 6 microns in terms of surface roughness Rz. Since the tube 108 is seamless, no seams appear on the surface of the roller 5. This makes it needless to polish or otherwise finish the surface of the roller 5 and, therefore, frees the roller 5 from polishing marks. It is to be noted that the tube 108 should be separable from (not adhesive to ) the fibers 122 or cooled film during the course of, among others, heating since it has to be removed afterwards. Also, it is necessary to prevent the tube 108 from melting in the event of heating, so that the tube 108 may surely press the melted fibers 122. To meet these requirements, the tube 108 should be made of a material which does not melt or has a melting point or softening point higher than the melting point of the fibers 122. When use is made of a thermally meltable tube 108, the fibers 122 and tube 108 are heated to a temperature higher than the melting point of the fibers 122 and lower than the melting point or softening point of the tube 108 in the event of heating the fibers 122.

An example and a comparative example associated with the fourth embodiment will be described hereinafter.

EXAMPLE

The base 10 made of Al and having a diameter D of 19.8 millimeters was prepared, as shown in FIG. 18A. If desired, Al may be replaced with any other conductive material, e.g., Cu or Fe. The fibers 122 were implemented as tubular fabric consisting of conductive fibers (Belitron available from Kanebo (Japan)) and dielectric fibers (Tetron available from Toray (Japan)). The fibers 122 were put on the base 10, and then the tube 108 made of thermocontractile PFA (perfluoroaloxy resin) available from Gunze (Japan) is put on the fibers 122. The tube 108 was 0.3 millimeters thick and had an inside diameter of 25 millimeters before contraction and an inside diameter of 16 millimeters when contracted by heat in a free state. The base 10 with the fibers 122 and without the tube 108 has the same appearance as one shown in FIGS. 5–7.

The tube 108 with the fibers 122 and tube 108 was mounted on a jig 116 shown in FIG. 9 which is essentially the same as the jig of FIG. 8, and was then put in a quartz glass tube 117. An opening formed at the top of the glass tube 117 was stopped by a plug 118 made of silicone rubber and provided with a vent tube 119. While air inside the glass tube 117 was discharged by a rotary pump, not shown, via the vent tube 119, the base 10, fibers 122 and tube 108 were bodily heated by a heater 120. The heating temperature was 270 degrees centigrade which was higher than the melting point (260 degrees centigrade) of Tetron (polyester) constituting the dielectric fibers and lower than the melting point (305 degrees centigrade) of PFA constituting the tube 108. Such a condition was held for 1 minute. As a result, the fibers 122 were melted and pressed by the contractile tube 108 to form a smooth film.

Subsequently, the heater 130 was turned off. When the temperature was lowered to 80 degrees centigrade, the base 10 with the film and tube 108 was removed from the glass tube 117 and then cooled to 25 degrees centigrade. Then, the tube 108 was pulled at the end thereof away from the hardened film. The resulting roller 5 with the film appears as shown in FIG. 18D. The surface roughness Rz of the roller 5 was measured to be 1.5 microns. As shown in FIGS. 9–11, the surface of the roller 5 has conductive portions and dielectric portions appearing on the surface thereof, the conductive portions being electrically connected to the conductive base 10.

Comparative Example

The above Example was repeated without using the PFA tube 108. The surface of the resulting roller was polished by sand paper #1000 to a surface roughness Rz of 1.6 microns. The roller 5 produced by the Example attained a comparable or even higher smoothness without resorting to polishing. The roller 5 produced by Example, and the roller produced by the Comparative Example and having the same surface roughness as the roller 5 were each incorporated in the developing device 2, FIG. 1, to perform filming tests. The developing device 2 was operated with two different kinds of toners 4, i.e., one having an average particle size of 12 microns and the other having an average particle size of 7 microns. The results of tests are shown in Table 1 below.

TABLE 1

| Particle Size (μm) | 7 | 12 |
|---|---|---|
| Roller of Example | no filming | no filming |
| Roller of Comparative Example | filming after 10,000 times of development | no filming |

As Table 1 indicates, with the roller of the Comparative Example whose surface is polished, filming occurs after 10,000 copies have been produced. By contrast, the roller 5 of the Example did not cause filming at all. The roller 5 is highly resistive to contamination even with the toner 4 whose particle size is smaller than 7 microns.

However, even the fourth embodiment including the Example thereof has a problem that developing rollers of various sizes are not attainable unless contractile tubes of corresponding diameters are prepared beforehand since the outside diameter of the roller depends on the outside diameter of the tube 108. This is undesirable from, for example, the management standpoint.

Figure 20:
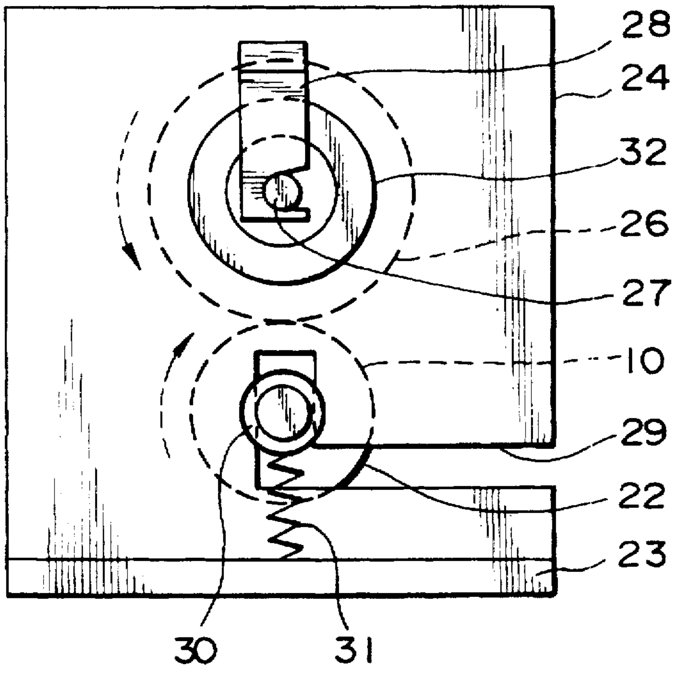
FIG. 20 is a side elevation showing a heating device representative of a fifth embodiment of the present invention.
Figure 21:
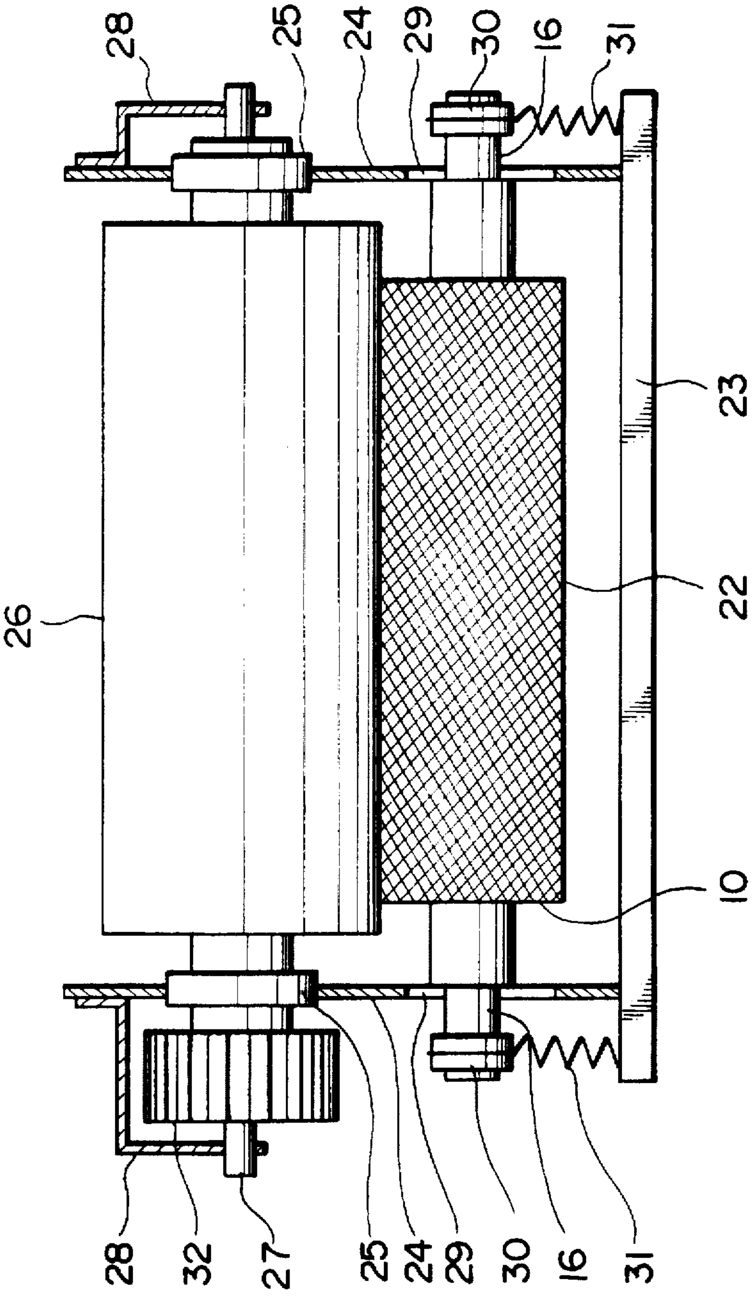
FIG. 21 is a vertical section of the heating device shown in FIG. 20.

Referring to FIGS. 20 and 21, a fifth embodiment will be described which eliminates the above problem and implements a toner carrier with a high surface precision with ease and at a low cost. As shown, a heating device has a base plate 23 and a pair of spaced support plates extending from the base plate 23. A beat roll 26 is rotatably supported by the support plates 24 through bearings 25. A heater 27 is passed through the heat roller 26 and affixed at opposite ends thereof to heater supports 28 removably mounted on respective support plate 24. The heater 27 heats the heat roll 26.

The conductive base 10, FIG. 4, provided with the conductive fibers and dielectric fibers by any one of the above embodiments is rotatably supported by the support plates 24, as shown in FIGS. 20 and 21. It is to be noted that the fibers are collectively designated by the reference numeral 22 by way of example. Specifically, the shaft portions 16 of the base 10 with the fibers 22 are inserted into notches 29 formed in the support plates 24. A bearing 30 is coupled over and is rotatable relative to each shaft portion 16 and is constantly biased upward by a spring 31, whereby the fibers 22 on the base 10 are pressed against the heat roll 26. Here, the fibers 22 have been simply put on the base 10. The heat roll 26 heated by the heater 27 is rotated by a drive source, not shown, via a gear 32 affixed to the roll 26 and another gear meshing with the gear 32. As a result, the heat roll 26 rotates the base 10 and thereby heats the fibers 22 while pressing them. Hence, the fibers 22 are at least partly melted. Then, the conductive portions and dielectric portions appear on the surface, and the conductive portions are held in contact with the base 10. Finally, the melted fibers are hardened to complete a developing roller.

Figure 22:
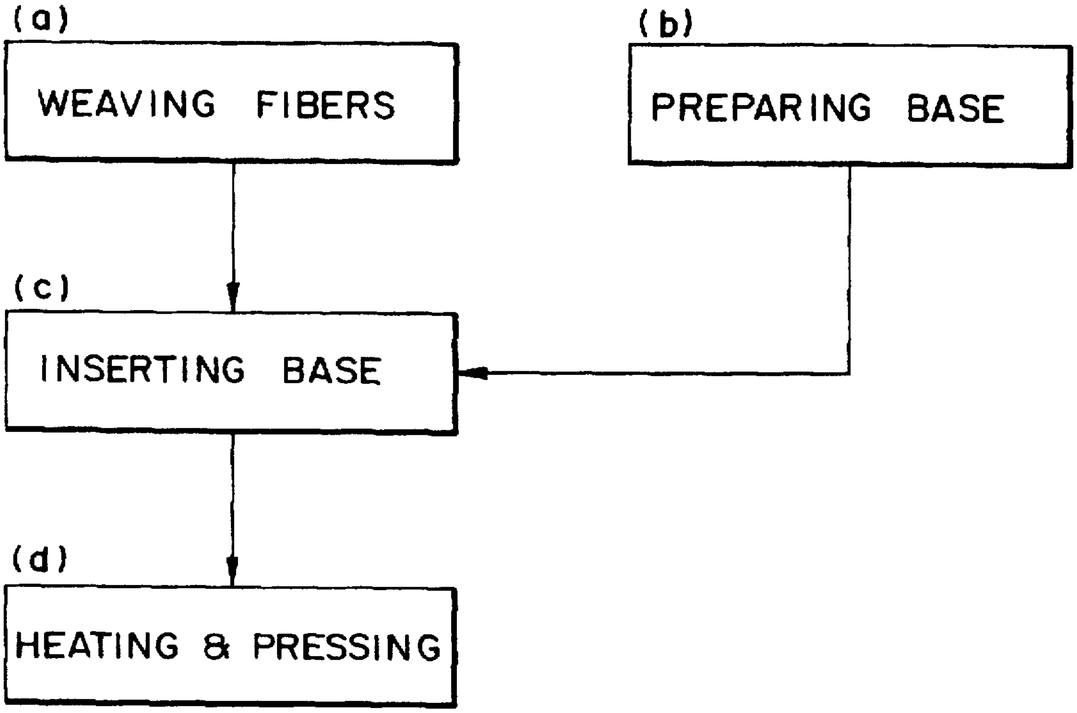
FIG. 22 is a flowchart demonstrating a method of producing a developing roller particular to the fifth embodiment.

The above procedure may be summarized as follows and as shown in FIG. 22:

(a) weaving the fibers 22 into, for example, a tube;

(b) producing the roller-like base 10 of Al or Fe;

(c) inserting the base 10 into, for example, the tubular fibers 22 woven at the step (a); and (d) melting the fibers 22 by heating and pressing them by the heat roll 26.

If desired, the steps (a) and (b) may be implemented as a single step, i.e., the fibers 22 may be directly wound round the base 10, as stated earlier.

Figure 23:
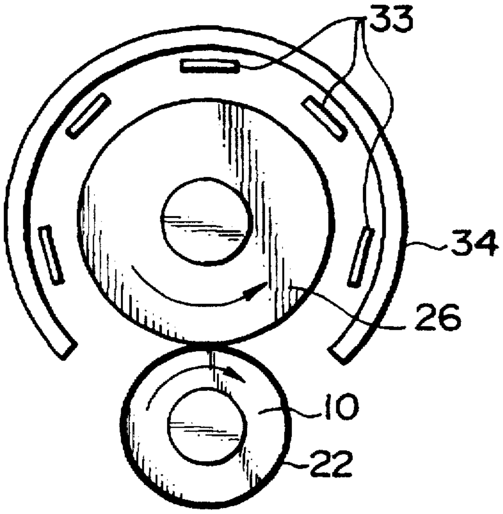
FIG. 23 is a fragmentary view of a sixth embodiment of the present invention.

FIG. 23 shows a sixth embodiment which is a modification of the fourth embodiment. Specifically, heaters 33 are arranged around the heat roll 26. A protective cover 34 is disposed around the heaters 33. While the heat roil 26 is heated by the heaters 33, it is rotated to in turn rotate the base 10 covered with the fibers 22, in exactly the same manner as in FIGS. 20 and 21. As a result, the fibers 22 are heated, pressed and at least partly melted. Of course, a heater may also be disposed in the heat roll 26 to heat the roll 26 from the inside and the outside.

In the fifth and sixth embodiments, the heat roller 26 not only heats the fibers 22 but also presses them. Hence, air existing in the fibers 22 and at the interface between the fibers 22 and the base 10 is forced out. This, coupled with the fact that the surface of the melted fibers is smoothed with high precision by the surface of the heat roll 26, provides the resulting roller with extremely high surface precision without resorting to a finishing step, while eliminating filming on the roller surface. Assume that the fibers 22 are configured as a tube before put on the base 10, and the tube is stored in a flat position. Then, the fibers 22 will be creased and will cause the creases to remain even when fitted on the base 10. Since the fifth and sixth embodiments melt and press such fibers 22, the fibers are free from creases and, therefore, prevent the surface of the roller from undulating. In addition, a roller having substantially any outside diameter can be surely and easily produced.

As stated above, the fifth and sixth embodiments are capable of producing a developing roller with a high surface precision and stable quality at a low cost.

To prevent the melted fibers from adhering to the surface of the heat roll 26, FIGS. 20, 21 and 23, it is preferable to implement the surface of the roll 26 by a material highly separable from the melted fibers. For example, the heat roll 26 may be made up of an Al or similar base, and a coating of perfluoroalcoxy or similar substance may be provided on the base. When a contact width or nip should be formed in the portion where the melted fibers 22 and heat roll 26 press against each other, the surface of the roll 26 may preferably be formed of silicone rubber, fluoric rubber or similar elastic and highly separable substance. In any case, the prerequisite is that the heat roll 26 be made of a substance which does not melt when heated or has a higher melting point that the fibers 22.

Of course, a toner carrier in the form of a developing belt, as distinguished from the roller 5, can be produced by exactly the same procedure except that a sheet- or belt-like conductive base will be covered with conductive fibers and dielectric fibers. Specifically, when a developing belt is to be produced by use of the heat roll 26 of the fifth or sixth embodiment, a sheet- or belt-like conductive base covered with conductive fibers and dielectric fibers is wound round a roller. Then, the roller with such fibers is rotatably supported by the support plates 24 in place of the base shown in FIGS. 18A–23.

In all the embodiments described so far, when the yarn to constitute the fibers is produced, it is stretched during extrusion in order to have higher strength. However, a strain ascribable to the extrusion remains in the resulting fibers. Hence, when such fibers are wound round the base 10 and heated, they tend to contract in such a manner as to remove the strain. Since the fibers are attached to the base 10, they cannot freely contract with the result that an intense strain occurs in the fibers. The strain is apt to cause the fibers to snap before melting. Assume that a conductive fiber snaps at a plurality of positions, e.g., two positions, and the resulting single piece of fiber does not contact the base 10. Then, this piece of the conductive fiber remains in an electrical floating state, i.e., it is not electrically connected to the base 10 or the other conductive fiber portions. In this state, the microfields described with reference to FIG. 3 are not generated. As a result, the amount of toner deposition on the corresponding part of the developing roller is reduced to lower the quality of a toner image, e.g., to reduce the reproducibility of a single dot to be formed on the photoconductive element or to degrade the uniformity of halftone.

Figure 24:
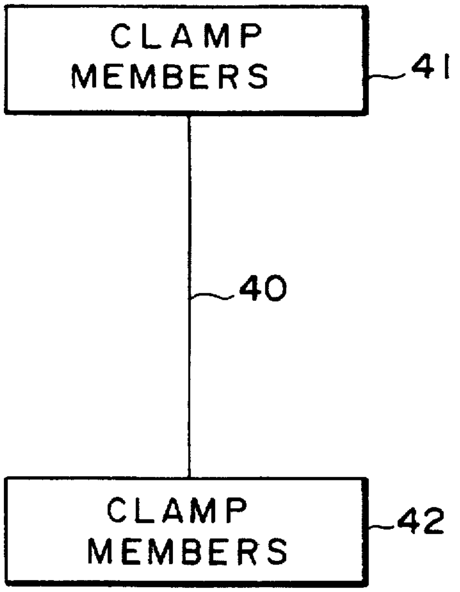
FIG. 24 shows a specific experiment for determining a strain remaining in yarn.
Figure 25:
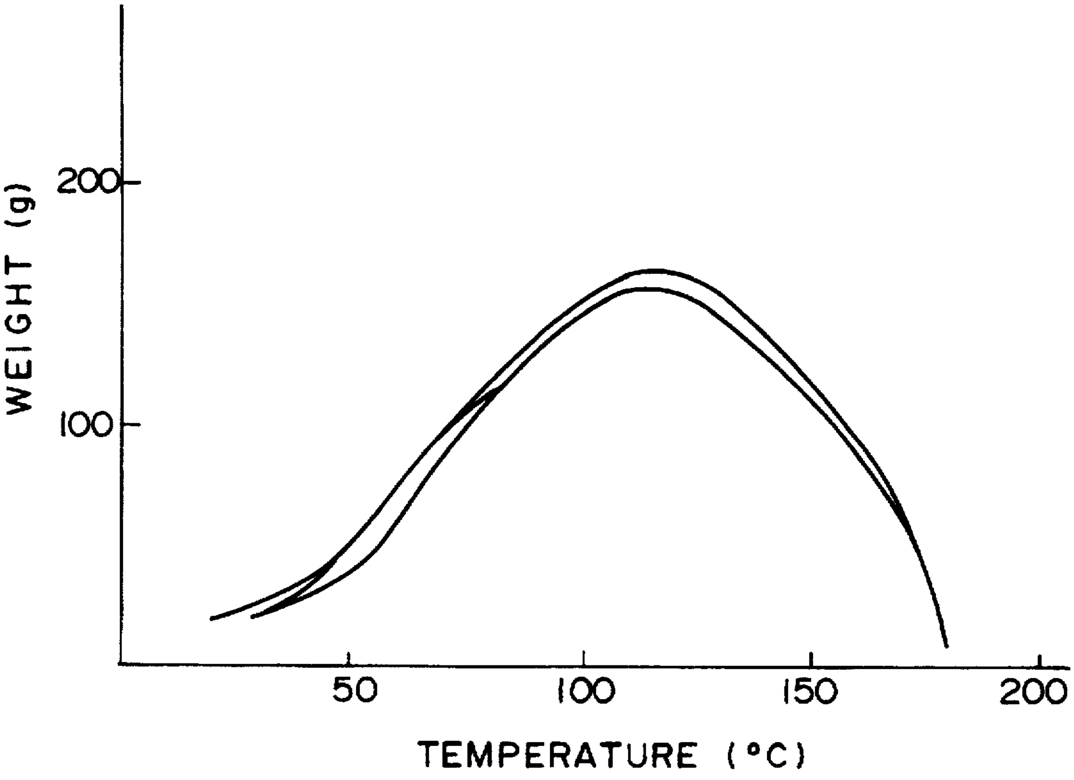
FIG. 25 is a graph indicative of the result of experiment.

FIG. 24 demonstrates an experiment wherein single yarn (320 denier and thirty-two filaments) 40 of a Nylon 12 fiber is retained by clamp members 41 and 42 at opposite ends thereof, and the atmosphere surrounding the yarn 40 is heated to heat the yarn 40. The heat generates a stress in the yarn 40 for the previously stated reason. FIG. 25 indicates a relation between the temperature of the yarn 40 (abscissa) and the load acting on the yarn 40 (ordinate). As shown, the yarn 40 contracts as the temperature thereof rises. When the yarn 40 is heated beyond a certain temperature, the stress ascribable to the load decreases. This is why the fibers put on the base 10 snap when heated, as stated earlier.

In a seventh embodiment to be described, the conductive fibers and dielectric fibers to cover the base 10 are heated beforehand so as to remove the strain thereof. Such fibers are put on the conductive base 10 and are then heated to have at least part thereof melted, as in the previous embodiments. When so heated, the fibers do not noticeably contract due to the preprocessing and, therefore, this prevents a great strain from occurring therein which would cause them to snap. Specifically, to remove the strain beforehand, the fibers may be heated in hot water or atmosphere or by the induction electromagnetic method practiced with a microwave oven. Preferably, the heating temperature for the preprocessing should be higher than one which maximizes the strain of the fibers while preventing the fibers from melting. Usually, it is desirable that the heating temperature for the preprocessing be about 70 percent to 85 percent of the absolute temperature of the melting point of the fibers; assuming Nylon 6 fibers, the temperature should preferably be 70 degrees to 160 degrees centigrade. For experiment, the fibers 11*c* and 12*c*, FIGS. 16 and 17, were heated in an atmosphere of 120 degrees centigrade for 30 minutes to remove the strain and then put on the base to produce the roller 5. The experiment showed that the fibers 11*c* and 12*c* hardly contracted and did not snap. When such a roller 5 was incorporated in the developing device 2, FIG. 1, toner images excellent in the reproducibility of a single dot and the uniformity of halftone were obtained.

With any of the previous embodiments, it is possible to produce a toner carrier having a conductive base and a microfield generating layer provided on the surface of the base. In the microfield generating layer, conductive fibers and dielectric fibers are at least partly melted to form conductive portions and dielectric portions, respectively. The conductive portions and dielectric portions appear on the surface of the toner carrier, the conductive portions contacting the base.

It should be noted that the methods shown and described are capable of producing various kinds of cylindrical members with high surface precision, not to speak of the developing roller having the microfield generating layer. The cylindrical members include a fixing roller and a coactive press roller incorporated in an image forming apparatus, a pick-up roller built in a paper feeding device, a transport roller for transporting a paper sheet, a charging roller for charging a photoconductive element, and a developing roller lacking the microfield generating layer.

The method using the contractile tube 108, as shown in FIGS. 18A–18D and 19, can produce a cylindrical member with enhanced surface smoothness and free from polishing marks. This kind of method is, therefore, applicable to various kinds of cylindrical members, especially a fixing roller which fixes a toner image on a recording sheet. Specifically, when polishing marks are left on the surface of the fixing roller, fine toner particles on a recording sheet are likely to drop in the marks and again deposit on the sheet to smear it. This is especially true when the particle size of the toner is less than 7 microns. Such an occurrence, generally referred to as an offset, prevents a high quality image from being formed on a recording sheet. Moreover, the polishing marks on the fixing roller, like the marks on the developing roller, are apt to cause the toner to form a film on the surface of the roller. This is also true with a pick-up roller included in a paper feeding device.

Reference and Comparative Reference to be described hereinafter pertain to a method of producing a fixing roller by use of the contractile tube 108 shown in FIGS. 18A–18D and 19. It is to be noted that to produce a cylindrical member other than the developing roller having the microfield generating layer, it is not always necessary to arrange the fibers on the surface of the base 10. FIGS. 18A–18, i.e., a covering at least part of which is constituted by a thermoplastic resin should only be put on the base 10. The covering may even be implemented by a sheet impermeable to air or by powder applied to the periphery of the base 10 and then baked. Further, the base 10 itself does not have to be conductive.

REFERENCE

A fixing roller applicable to, for example, a copier is heated by a heater built therein and coacts with a press roller to fix a toner image formed on a recording sheet. The recording sheet is passed between the two rollers such that the toner image contacts the fixing roller. Reference also uses the heating device shown in FIGS. 18A–18D and differs from the previously stated Example in that the Al base 10 is implemented as a pipe having an outside diameter of 20.00 millimeters and a wall thickness of 0.7 millimeters, in that the covering 122 on the base 10 is formed by applying PFA powder to the periphery of the base 10 and then baking it for 10 minutes, and in that the tube 108 has a thickness of 0.2 millimeters and an inside diameter of 20.3 millimeters before contraction. The base 10 with the covering 122 and tube 108 was heated at 360 degrees centigrade, which is higher than the melting point (305 degrees centigrade) of PFA and lower than the softening point (700 degrees centigrade) of polyimide, for 10 minutes by the heating device of FIG. 19 and then cooled. Thereafter, the tube 108 is removed from the covering 122 and base 10. The resulting fixing roller was found to have a surface roughness Rz of 1.8 microns.

Comparative Reference

A roller was produced by the same procedure as Reference but without using the polyimide tube. The surface of the roller was polished by sand paper #1000 to a surface roughness Rz of 1.9 microns.

Figure 26:
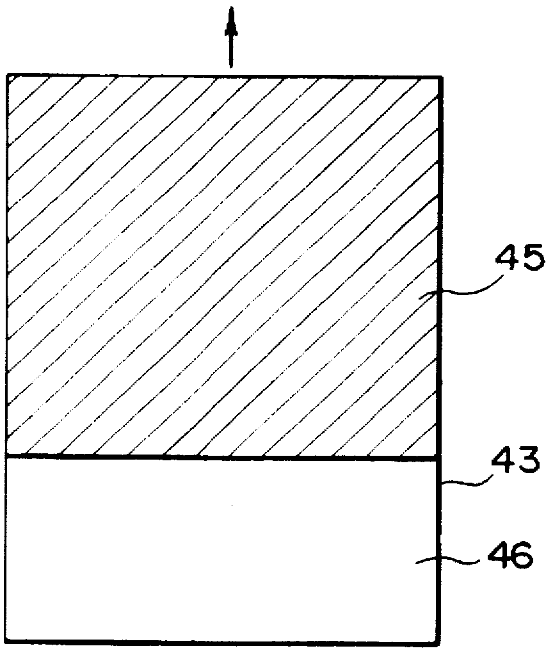
FIG. 26 shows a recording sheet formed with a solid image for determining an offset.

As stated above, the Reference achieves a fixing roller comparable in surface roughness with a fixing roller of the Comparative Reference without resorting to polishing. The fixing rollers of the Reference and Comparative Reference were each mounted on a copier using a toner having an average particle size of 12 microns and a toner having an average particle size of 7 microns. The copier was operated to copy a test pattern shown in FIG. 26 to observe the offset. Specifically, a black solid image 45 was formed on a recording sheet 43 moving in a direction indicated by an arrow. The toner transferred to the fixing roller and then deposited on the background 46 of the sheet 43 was observed. The result of observation is shown in Table 2 below. In Table 2, the symbols "x" and "o" indicate respectively that an offset occurred and that it did not occur.

TABLE 2

| | 7 | | 12 | |
|---|---|---|---|---|
| Particle Size (μm) | 1–1000 copies | 1000–2000 copies | 1–1000 copies | 1000–2000 copies |
| Roller of Reference | O | O | O | O |
| Roller of Comparative Reference | X | O | O | O |

As Table 2 indicates, when use is made of the toner whose particle size is 7 microns, the fixing roller of Comparative Reference causes an offset to occur in an early stage of operation (1 to 1,000 copies). By contrast, the fixing roller of the Reference maintains high resistivity to contamination despite such a particle size of the toner.

It is noteworthy that the fixing roller of the above Reference and that of the previously sated Example achieve higher durability since they are free from polishing marks. Polishing marks would cause wear to grow from their fine grooves to thereby reduce durability. This is also true with cylindrical members other than the fixing roller and developing roller. This is eliminated if the covering 122 on the base 10 has the surface thereof smoothed by the contractile tube while being heated, as in the Example or the Reference. Durability tests were conducted with the Example, Comparative Example, Reference, and Comparative Reference, as follows.

Figure 27:
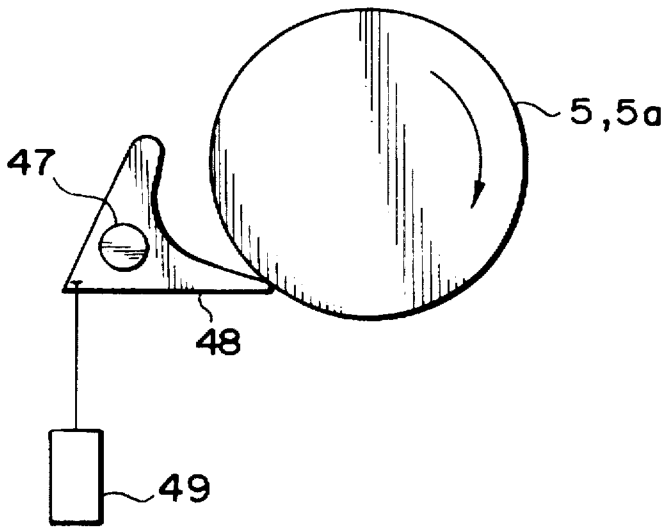
FIG. 27 shows a specific arrangement for causing the surface of a roller to wear.
Figure 28A:
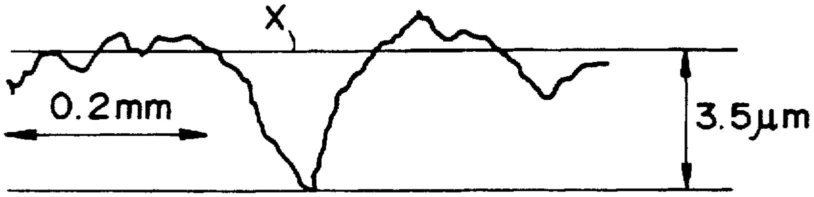
FIGS. 28A–28D are enlarged views each indicating a particular worn state of a roller.
Figure 28B:
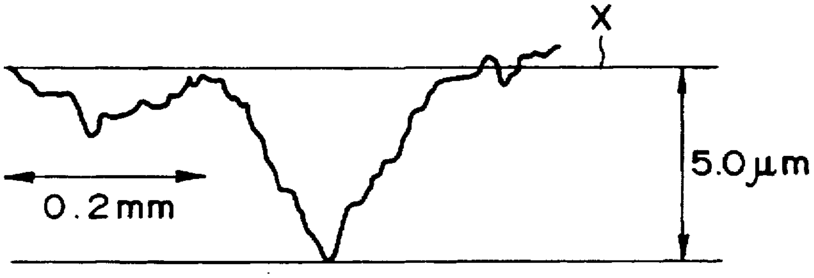
Figure 28C:
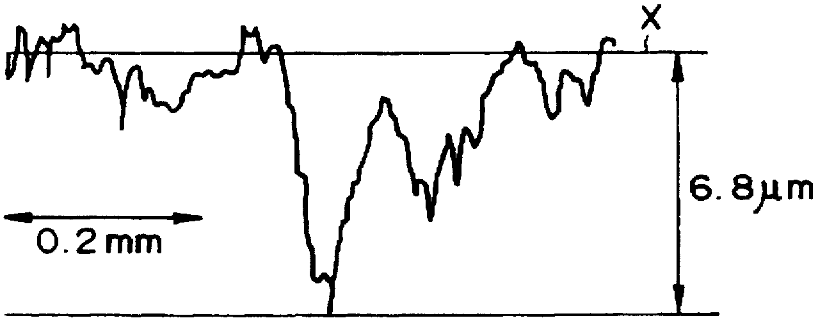
Figure 28D:
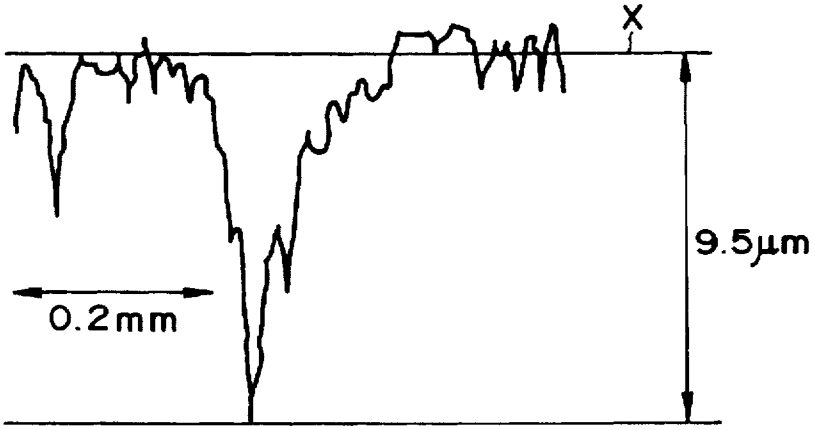

The developing roller 5 or **5*a* produced by each of the Example, Comparative Example, Reference and Comparative Reference was positioned as shown in FIG. 27. A pawl 48 made of a fluoric resin was rotatably mounted on a shaft 47 and held in contact with the surface of the roller 5 or 5*a* at one end thereof. The load of a weight 49 was applied to the pawl 48 to urge the pawl 48 against the roller 5 or 5*a*. In this condition, the roller 5 or 5*a* was rotated for 100 hours at a temperature of 100 degrees centigrade. The depth to which the surface of each roller 5 or 5*a* was caused to wear by the pawl 48** was measured by a surface roughness gauge. Table 3 shown below lists the results of such wear acceleration tests.

TABLE 3

| | Wear Depth (μm) | | | |
|---|---|---|---|---|
| Roller | Measured Value | | | Mean |
| Example | 3.2 | 4.5 | 3.5 | 3.7 |
| Comparative Example | 6.0 | 6.4 | 6.8 | 6.4 |
| Reference | 5.3 | 4.9 | 5.0 | 5.1 |
| Comparative Reference | 8.8 | 9.6 | 9.5 | 9.3 |

As Table 3 indicates, the wear caused by the pawl 48 is less in the roller without polishing (Example and Reference) than in the roller with polishing (Comparative Example and Comparative Reference). This is presumably because the surface of the polished roller sequentially wears due to the growth of the polishing marks, as shown in FIGS. 28A–28D which are associated with the Example, Comparative Example, Reference, and Comparative Reference, respectively. In FIGS. 28A–28D, labeled X is the average level of each roller before the pawl 48 causes it to wear. The pawl 48 was found to scratch the rollers to the depths shown in the figures. Such an advantage is also achievable with cylindrical members other than the developing roller and fixing roller.

In summary, in accordance with the present invention, a toner carrier of the type generating microfields can be produced at a low cost by a simple procedure wherein the surface of a conductive base is covered with fibers and is then heated. Particularly, a toner carrier with a high surface precision is achievable by a simple and inexpensive procedure and without resorting to a surface finishing step. Moreover, a toner carrier capable of surely generating microfields without effecting the contact of conductive fibers and base is attainable.

Various modifications will become possible for those skilled in the art after receiving the teachings of the present disclosure without departing from the scope thereof.

What is claimed is:

1. A toner carrier comprising:
   - a conductive base having an outer surface; and
   - a layer comprising conductive fibers and dielectric fibers and covering the outer surface of said conductive base and formed by melting at least part of at least one of the conductive fibers and dielectric fibers, the layer having an inner surface and an outer surface;
   - said layer having conductive portions and dielectric portions formed by said conductive fibers and said dielectric fibers and appearing on the outer surface of said layer, said conductive portions contacting said conductive base.

2. A toner carrier comprising:
   - a conductive base;
   - a layer covering the conductive base, said layer comprising:
     - conductive fibers formed of a first material; and
     - dielectric fibers woven together with the conductive fibers, said dielectric fibers being formed of a second material.

3. The toner carrier according to claim 2, wherein the first and second materials are respective first and second thermoplastic resins.

4. The toner carrier according to claim 2, wherein the first material comprises nylon fibers containing carbon.

5. The toner carrier according to claim 2, wherein the second material comprises nylon fibers containing carbon.

6. The toner carrier according to claim 2, wherein at least one of the conductive and dielectric fibers are at least partially melted.

7. A toner carrier comprising:
   - a conductive base;
   - a layer covering the conductive base, said layer comprising:
     - first fibers formed of a first material;
     - second fibers woven together with the first fibers, said second fibers being formed of a second material.

8. The toner carrier according to claim 7, wherein the first and second fibers each comprise dielectric portions and conductive portions.

9. The toner carrier according to claim 8, wherein at least one of the first and second fibers are at least partially melted.

10. The toner carrier according to claim 7, wherein the first and second materials are respective first and second thermoplastic resins.

11. The toner carrier according to claim 8, wherein the first and second materials are respective first and second thermoplastic resins.

12. The toner carrier according to claim 7, wherein the first fibers comprise conductive fibers and the second fibers comprise dielectric fibers.

13. The toner carrier according to claim 12, wherein the first and second materials are respective first and second thermoplastic resins.

14. A toner carrier comprising:
   - a conductive base; and
   - a layer covering said conductive base, said layer comprising:
     - conductive fibers covering said conductive base; and
     - dielectric fibers covering said conductive base and extending in a direction in which said dielectric fibers are woven with said conductive fibers;
     - wherein at least one of said conductive fibers and said dielectric fibers are melted by heat such that conductive portions and dielectric portions are respectively formed by said conductive fibers and said dielectric fibers on an outer surface of said layer opposite to an inner surface contacting said conductive base, and such that at least conductive portions are formed on said inner surface by said conductive fibers.

15. A toner carrier as claimed in claim 14, wherein said conductive fibers are melted by heat.

16. A toner carrier as claimed in claim 15, wherein said conductive fibers are formed of carbon-containing thermoplastic resin.

17. A toner carrier as claimed in claim 16, wherein said conductive fibers are melted at a temperature higher than a melting point of the thermoplastic resin constituting said conductive fibers, and preventing the carbon from being dispersed over an entire area of said layer.

18. A toner carrier comprising:
   - a conductive base; and
   - a layer covering said conductive base, said layer comprising:
     - conductive fibers and dielectric fibers covering said conductive base while said conductive fibers at least partly contacting a periphery of said conductive base and said dielectric fibers extending in a direction in which said dielectric fibers are woven with said conductive fibers;
     - wherein at least one of said conductive fibers and said dielectric fibers are melted by heat such that conductive portions and dielectric portions are respectively formed by said conductive fibers and said dielectric fibers on an outer surface of said layer opposite to an inner surface contacting said conductive base, and such that at least conductive portions are formed on said inner surface of said layer by said conductive fibers and to contact said periphery of said conductive base.

19. A toner carrier as claimed in claim 18, wherein said conductive portions are formed of carbon-containing thermoplastic resin.

20. A toner carrier as claimed in claim 19, wherein said conductive fibers are melted at a temperature higher than a melting point of the thermoplastic resin constituting said conductive fibers, and preventing the carbon from being dispersed over an entire area of said layer.

21. A toner carrier comprising:
   - a conductive base; and a layer covering said conductive base and comprising fibers covering a periphery of said conductive base, said fibers including conductive portions and dielectric portions;

wherein at least one of said conductive portions and said dielectric portions are melted by heat such that said conductive portions and said dielectric portions are respectively formed on an outer surface of said layer opposite to an inner surface contacting said conductive base, and such that at least conductive portions are formed on said inner surface of said layer to contact said periphery of said conductive base.

22. A toner carrier as claimed in claim 21, wherein said conductive portions are melted by heat.

23. A toner carrier as claimed in claim 22, wherein said conductive portions are formed of carbon-containing thermoplastic resin.

24. A toner carrier as claimed in claim 21, wherein said conductive portions are formed of conductive fibers.

25. A toner carrier is claimed in claim 21, wherein said dielectric portions are formed of conductive fibers.

26. A tone carrier comprising:

a conductive base; and layer covering said conductive base, said layer comprising:

conductive fibers covering said conductive base while at least partly contacting a periphery of said conductive base; and dielectric fibers covering said conductive base and extending in a direction in which said dielectric fibers are woven with said conductive fibers;

wherein at least one of said conductive fibers and said dielectric fibers are melted by heat such that conductive portions and dielectric portions are respectively formed by said conductive fibers and said dielectric fibers on an outer surface of said layer opposite to an inner surface contacting said conductive base and microfields are formed at adjacent conductive and dielectric portions, and such that at least conductive portions are formed on said inner surface of said layer by said conductive fibers and to contact said periphery of said conductive base.

27. A toner carrier as claimed in claim 26, wherein said conductive portions are formed of carbon-containing thermoplastic resin.

28. A toner carrier as claimed in claim 27, wherein said conductive fibers are melted at a temperature higher than a melting point of the thermoplastic resin constituting said conductive fibers, and preventing the carbon from being dispersed over an entire area of said layer.

29. A toner carrier comprising:

a conductive base; and a layer covering said conductive base, said layer comprising:

conductive fibers covering said conductive base while at least partly contacting a periphery of said conductive base; and dielectric fibers covering said conductive base;

wherein said conductive fibers and said dielectric fibers are woven together and formed in a net, wherein at least one of said conductive fibers and said dielectric fibers are melted by heat such that conductive portions and dielectric portions are respectively formed by said conductive fibers and said dielectric fibers on an outer surface of said layer opposite to an inner surface contacting said conductive base, and such that at least conductive portions are formed on said inner surface of said layer by said conductive fibers and to contact said periphery of said conductive base.

30. A toner carrier as claimed in claim 29, wherein said conductive portions are formed of carbon-containing thermoplastic resin.

31. A toner carrier as claimed in claim 30, wherein said conductive fibers are melted at a temperature higher than a melting point of the thermoplastic resin constituting said conductive fibers, and preventing the carbon from being dispersed over an entire area of said layer.

32. A toner carrier comprising:

a conductive base; and a layer covering said conductive base and comprising fibers covering a periphery of said conductive base, said fibers including conductive portions and dielectric portions woven together and formed in a net;

wherein at least one of said conductive portions and said dielectric portions are melted by heat such that said conductive portions and said dielectric portions are respectively formed on an outer surface of said layer opposite to an inner surface contacting said conductive base, and such that at least conductive portions are formed on said inner surface of said layer to contact said periphery of said conductive base.

33. A toner carrier as claimed in claim 32, wherein said conductive portions are melted by heat.

34. A toner carrier as claimed in claim 33, wherein said conductive portions are formed of carbon-containing thermoplastic resin.

35. A toner carrier as claimed in claim 32, wherein said conductive portions are formed of conductive fibers.

36. A toner carrier as claimed in claim 32, wherein said dielectric portions are formed of conductive fibers.

37. A toner carrier comprising:

a conductive base;

a conductive adhesive covering said conductive base;

a layer covering said conductive adhesive, said layer comprising:

conductive fibers covering said conductive base; and dielectric fibers covering said conductive base and extending in a direction in which said dielectric fibers are woven with said conductive fibers;

wherein at least one of said conductive fibers and said dielectric fibers are melted by heat such that conductive portions and dielectric portions are respectively formed by said conductive fibers and said dielectric fibers on an outer surface of said layer opposite to an inner surface contacting said conductive base, and such that at least conductive portions are formed on said inner surface by said conductive fibers.

38. A toner carrier as claimed in claim 37, wherein said conductive fibers are melted by heat.

39. A toner carrier as claimed in claim 38, wherein said conductive fibers are formed by carbon-containing thermoplastic resin.

40. A toner carrier as claimed in claim 39, wherein said conductive fibers are melted at a temperature higher than a melting point of the thermoplastic resin constituting said conductive fibers, and preventing the carbon from being dispersed over an entire area of said layer.

41. A method for producing a toner carrier, comprising the steps of:

covering a conductive base with conductive fibers and dielectric fibers woven together;

fitting a contractile tube over the conductive and dielectric fibers without melting the contractile tube; and at least partly melting the conductive fibers and dielectric fibers without melting the contractile tube.

42. The method according to claim 41, further comprising the step of depressurizing an interface between the contractile tube and the conductive fibers and dielectric fibers prior to the step of at least partly melting the conductive fibers and dielectric fibers.

43. The method according to claim 41, wherein the conductive fibers and dielectric fibers are formed as a net.

44. The method according to claim 42, wherein the conductive fibers and dielectric fibers are formed as a net.

* * * * *